United States Patent [19]

Hedges et al.

[11] 4,415,725

[45] Nov. 15, 1983

[54] AROMATIC BRANCHED POLYCARBONATE FROM TETRAPHENOL

[75] Inventors: Charles V. Hedges, Mt. Vernon; Victor Mark, Evansville, both of Ind.

[73] Assignee: General Electric Co., Mt. Vernon, Ind.

[21] Appl. No.: 360,044

[22] Filed: Mar. 19, 1982

[51] Int. Cl.$^3$ .............................................. C08G 63/62
[52] U.S. Cl. .................................. 528/204; 528/196; 568/718; 568/720
[58] Field of Search ................................ 528/204, 196

[56] References Cited

PUBLICATIONS

English Language Translation of Chemische Berichte, 1912, pp. 2489-2491.

*Primary Examiner*—Harold D. Anderson
*Attorney, Agent, or Firm*—Martin B. Barancik

[57] ABSTRACT

This invention relates to tetraphenolic compounds that have utility as branching agents for the manufacture of novel randomly branched polycarbonates. The polycarbonates are useful in the fabrication of blow molded articles.

4 Claims, No Drawings

AROMATIC BRANCHED POLYCARBONATE FROM TETRAPHENOL

This invention relates to tetraphenolic compounds that have utility as branching agents for the manufacture of novel randomly branched polycarbonates. These randomly branched polycarbonates have excellent thermal resistance, excellent light stability, enhanced hydrolytic stability and high melt strength as compared to other branched polycarbonates. These desirable properties make the novel branched polycarbonates particularly useful for the fabrication of blow molded articles although they may be employed for diverse molding applications.

BACKGROUND OF THE INVENTION

Polycarbonates are well known, commercially important materials which are produced in large quantities. Such polymers are typically prepared by reacting a carbonate precursor with a dihydric phenol to provide a linear polymer consisting of units of the dihydric phenol linked to one another through carbonate linkages. These polymers have outstanding mechanical, thermal, and optical properties such as high tensile strength, optical clarity (transparency), thermal and dimensional stability and impact strength.

These aromatic polycarbonates differ from most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. However, in contrast to most thermoplastic polymers, polycarbonates prepared from dihydric phenols exhibit Newtonian flow at normal processing temperatures and shear rates below 300 reciprocal seconds.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion below molding, particularly in fabrication by extrusion blow molding. Non-Newtonian flow characteristics tend to impart melt elasticity and melt strength to polymers thus allowing their use in blow molding fabrication. In the usual blow molding operation, a tube of a molten thermoplastic is extruded vertically downward into a mold, followed by the introduction of a gas, such as air, into the tube thus forcing the molten plastic to conform to the shape of the mold. The length of the tube and the quantity of material forming the tube are limiting factors in determining the size and wall thickness of the object that can be molded by this process. The fluidity of the melt obtained from bisphenol-A polycarbonate, or the lack of melt strength as well as the paucity of extrudate swelling, serve to limit blow molding applications to relatively small, thin walled parts. Temperatures must generally be carefully controlled to prevent the extruded tube from falling away before it attains the desired length and the mold is closed around it for blowing. Consequently, the Newtonian behavior of polycarbonate resin melts has severely restricted their use in the production of large hollow bodies by conventional extrusion blow molding operations as well as the production of various other shaped by profile extrusion methods.

Thermoplastic randomly branched polycarbonates exhibit unique properties of non-Newtonian flow, melt elasticity and melt strength which permit them to be used to obtain such articles as bottles which were not heretofore easily or readily produced with linear polycarbonates. The thermoplastic, randomly branched polycarbonates can be prepared by reacting a polyfunctional compound containing three or more functional groups with a dihydric phenol and a carbonate precursor.

DESCRIPTION OF THE INVENTION

The invention contemplates tetraphenolic compounds of the formula:

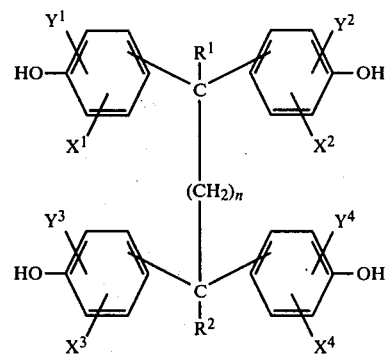

wherein $X^1$, $X^2$, $X^3$, $X^4$, $Y^1$, $Y^2$, $Y^3$ and $Y^4$ are independently selected from hydrogen, chlorine, bromine and alkyl of from 1 to 6 carbon atoms or aryl; n is an integer of 0, 1, 2, 3, 4, 5 or 6; and $R^1$ and $R^2$ are independently selected from hydrogen and alkyl of from 1 to 6 carbon atoms and mixtures of such compounds.

Preferred compounds are of the formula:

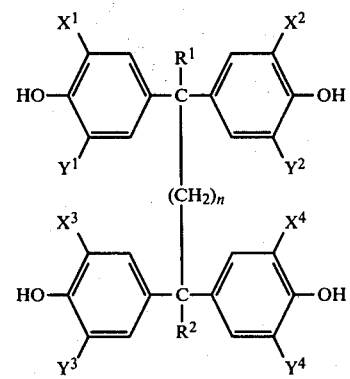

wherein $X^1$, $X^2$, $X^3$, $X^4$, $Y^1$, $Y^2$, $Y^3$, $Y^4$, $R^1$, $R^2$ and n are the same as hereinabove defined.

Also included within the preferred tetraphenolic compounds are compounds of the formula:

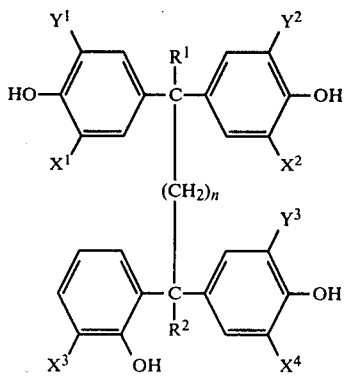

wherein $X^1$, $X^2$, $X^3$, $X^4$, $Y^1$, $Y^2$, $Y^3$, $R^1$, $R^2$ and n are the same as hereinabove defined.

As used herein the term alkyl includes both straight and branched chain alkyl groups such as methyl, ethyl, propyl, isopropyl, n-butyl, isobutyl, sec.-butyl, tert.-butyl, n-hexyl and the like. The term aryl includes phenyl, naphthyl and alkyl (1 to 6 carbon) substituted derivatives thereof.

Preferred compounds include those where $R^1$ and $R^2$ are methyl and n is 2 and when each R is hydrogen and n is 0.

Specific examples of the tetraphenolic compounds include:

2,2,5,5-tetrakis(4-hydroxyphenyl)hexane
2,2,4,4-tetrakis(4-hydroxyphenyl)pentane
2,2,6,6-tetrakis(3-methyl-4-hydroxyphenyl)octane
1,1,6,6-tetrakis(3-chloro-4-hydroxyphenyl)heptane
1,1,2,2-tetrakis(4-hydroxyphenyl)ethane
2,2,5,5-tetrakis(3,5-dimethyl-4-hydroxyphenyl)hexane
2,2,5,5-tetrakis(3-bromo-5-methyl-4-hydroxyphenyl)hexane
2(2-hydroxyphenyl)-2,5,5-tris(4-hydroxyphenyl)hexane
2(4-hydroxyphenyl)-2,5,5-tris(3-chloro-4-hydroxyphenyl)hexane
2(3,5-dichloro-4-hydroxyphenyl)-2,5,5-tris(3-chloro-4-hydroxyphenyl)hexane
2(3-chloro-2-hydroxyphenyl)-2,5,5-tris(3-chloro-4-hydroxyphenyl)hexane
2,2,5,5-tetrakis(3-tert-butyl-5-methyl-4-hydroxyphenyl)hexane
2,2-bis(4-hydroxyphenyl)-5,5-bis(3-methyl-4-hydroxyphenyl)hexane The novel tetraphenols can be prepared from the corresponding dicarbonyl compounds, their hemiacetals, acetals, hemiketals, ketals or their enol ethers and esters. The halogenated derivatives are best prepared by halogenation of the appropriate precursor.

The condensation reaction is best carried out by utilizing the phenolic reactant in excess of the stoichiometric amount. With phenols that are solid at ambient temperature, this method requires reaction temperatures near or above the melting point of the phenol that is used in excess. In addition, non-phenolic solvents, such as acetic acid, acetic anhydride, methylene chloride, can be used.

The reaction temperature encompasses ambient temperatures to elevated temperatures, such as 100° C., or higher. Although the reaction rate is faster at higher temperatures, there is also an increase in undesired by-products, such as isomeric tetraphenols, which are less effective than the entirely p-substituted tetraphenols in the copolymerization reaction with the diphenols.

The condensation reaction can be carried out either at atmospheric or superatmospheric pressures.

The progress of the condensation reaction can be monitored by chromatographic or spectroscopic methods. Since the reaction takes place stepwise, it becomes relatively easy to follow the production of the intermediate diphenol carbonyl compound. It is understood that this intermediate compound may be isolated and later utilized to form the desired tetraphenol compound. If the intermediate diphenol is left in the reaction mixture it will convert to the desired tetraphenolic compound.

The reaction can be followed readily by infrared (ir) spectroscopy by the diminution or disappearance of the carbonyl bond, a very strong, characteristic and diagnostic ir band, well suitable for qualitative and quantitative analysis.

Similarly, proton nuclear magnetic resonance spectroscopy can sometimes be used at great advantage: an increase of resonance peaks in the aromatic region that are characteristic of the product, and not the precursor, can yield a readily available, quantitative information via integration of the specific aromatic and aliphatic region signals.

When X represents chlorine or bromine substituents, the novel tetraphenols can also be prepared by direct halogenation, in solution or suspension, of the corresponding non-halogenated tetraphenols. Methylene chloride, chloroform, acetic acid, water, other nonreactive liquids and aqueous sodium hydroxide solution may be used as solvents or dispersants. The degree of halogenation can readily be followed by gas or liquid chromatography, ir or proton nmr.

The phenolic moieties on the invention's novel compounds may be similarly substituted or they may be "mixed," i.e., one or more of these moieties may have different substituents. One particularly convenient method of preparing mixed tetraphenolic compounds of the present invention is to react a dione precursor with a phenol starting material as set forth above, isolate the intermediate diphenol and react this diphenol with a different phenol compound to thereby form a mixed tetraphenol compound.

Purification, of the tetraphenolic compounds can be carried out by recrystallization, elution chromatography, or other methods known to those skilled in the art. Preferred solvents of recrystallization are methylene chloride, benzene, cyclohexane, methanol, ethanol and alcohol-water mixtures. Elution chromatography is carried out best over alumina or silica, using a variety of solvents as eluants.

It is readily apparent that the modes in which the tetraphenolic compounds are synthesized may result in isomeric mixtures due to the fact that phenolic compounds are capable of reacting preferably at the carbon that is ortho or para to the phenolic hydroxyl group. The halogenated tetraphenolic compounds may also be present as mixtures if an isomeric mixture of tetraphenolic compounds is used as a starting material and/or the mixture of isomers that result from the halogenation of even a pure tetraphenolic isomer.

The tetraphenols may be prepared in a pure form for use as branching agents for polycarbonates or if desired, isomeric mixtures of these branching agents may be employed alone or with other branching agents.

The tetraphenols of the instant invention may be used to make novel branched aromatic polycarbonates having an IV of about 0.3 to 1.0 dl/g as measured in methylene chloride at 25° C. These branched polycarbonates are substantially free of crosslinking.

In the preparation of the novel thermoplastic randomly branched polycarbonates of this invention, the amount of the tetraphenolic compound which is reacted with the dihydric phenol and the carbonate precursor is critical to the extent that the amount employed must be sufficient to produce a true thermoplastic randomly branched polycarbonate which is substantially free of crosslinking. If an amount of tetraphenolic compound employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ 0.01 to about 3.0 and more particularly, 0.0-1-1.0 mole percent of the tetraphenolic compound, based upon the total moles of dihydric phenol.

The dihydric phenols that can be employed in the practice of this invention include bis(4-hydroxyphenyl)methane, 1,1-bis(4-hydroxyphenyl)ethane, 2,2-bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxy-3-chlorophenyl)propane, 2,2-bis(4-hydroxy-3,5-dibromophenyl)propane, 1,1-bis(4-hydroxyphenyl)cyclohexane, p,p'-dihydroxydiphenyl, 3,3'-dichloro-4,4'-dihydroxydiphenyl, bis(4-hydroxyphenyl)ether, bis(4-hydroxyphenyl)sulfone, bis(3,5-dimethyl-4-hydroxyphenyl)sulfone, resorcinol, hydroquinone; 1,4-hydroxy-2,5-dichlorobenzene, 1,4-dihydroxy-3-methylbenzene, bis(4-hydroxyphenyl)sulfoxide, bis(4-hydroxyphenyl)sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more dibasic acids in the event of polycarbonate copolymer or copolyestercarbonate rather than a homopolymer is desired for use in the preparation of the branched polymers of this invention. The preferred dihydric phenol is bisphenol-A.

The carbonate precursor employed can be either a carbonyl halide, a haloformate or a diaryl carbonate. Thus the carbonyl halides can be carboyl chloride, carbonyl bromide, and mixtures thereof. The haloformates suitable for use include mono- or bishaloformates of dihydric phenols (bischloroformates of hydroquinone, monochloroformate of bisphenol-A, etc.) or bishaloformates of glycols (bishaloformates of ethylene glycol, neopentyl glycol, polyethylene glycol, etc.). When using bishaloformates, equimolar amounts of free dihydric phenols are required to effect polymerization. When polymerizing monohaloformates of diphenols no free diphenol is required. While other carbonate precursors will occur to those skilled in the art, carbonyl chloride, also known as phosgene is preferred.

The polymerization of dihydric phenols to high molecular weight polycarbonates may be carried out by an conventional method known in the art. For example, phosgene can be introduced into a solution of the diphenol in organic bases, such as pyridine, triethylamine, dimethylaniline or into solutions of the diphenol in suitable organic solvents, such as benzene, toluene, chlorobenzene, methylene chloride, carbon tetrachloride and the like, with the addition of acid binding agents.

In the most widely practiced polymerization process phosgene is introduced into an aqueous solution of the alkali metal salt of the diphenol in the presence of methylene chloride and a phase-transfer catalyst as well as a molecular weight regulator, usually a monofunctional phenol. One advantage of the instant invention is that the tetraphenolic branching agent has the same reactivity profile as the diphenol used to make the linear chains, hence it can be added, in the desired amount, not only later but together with the diphenol at the beginning of the polymerization process. In other words, the tetraphenolic compounds can be formulated directly into the reaction mixture to be polymerized to branched polycarbonates.

The reaction between the halogen containing carbonate precursor and the dihydric phenol and the tetraphenolic branching agent when carried out by the interfacial method in accordance with this invention is conducted in the presence of an inert organic solvent which is essentially immiscible with water and does not deleteriously affect the formed polymer. Examples of suitable organic solvents as methylene chloride, ethylene dichloride and chlorobenzene.

In a preferred variant of the polymerization process, the branching tetraphenol is added in the form of an aqueous solution of its alkali metal salt. This is possible since the novel tetraphenols of the instant invention are capable of forming stable aqueous solutions in the form of their alkali salts. The novel branching agent may also be formulated into the reaction mixture of the dihydric phenol to be polymerized in finely divided solid form or as a methylene chloride solution or slurry. In either form it is copolymerized readily in the polycarbonate forming process and becomes a fully incorporated segment.

The alkali metal hydroxide which can be employed in the polymerization process can be any of the alkali metal hydroxides selected from the groups consisting of the alkali group and the alkaline earth groups. Specifically, these include potassium hydroxide, sodium hydroxide, lithium hydroxide, calcium hydroxide, magnesium hydroxide and the like.

The interfacial, or phase transfer catalysts, which can be employed in the polymerization process can be any of the suitable catalysts that aid the polymerization of dihydric phenols with phosgene. Suitable catalysts include tertiary amines such as triethylamine, tripropylamine, N,N-dimethylaniline and the like; quaternary ammonium compounds such as tetraethylammonium chloride, cetyl triethyl ammonium bromide, tetra-n-heptylammonium iodide, tetra-n-propyl ammonium chloride tetramethylammonium chloride, tetramethylammonium hydroxide, tetra-n-butylammonium iodide, benzyltrimethylammonium chloride and the like; and quaternary phosphonium compounds such as n-butyltriphenyl phosphonium bromide and tetrabutyl phosphonium chloride and the like.

The molecular weight regulators which can be employed in the interfacial process include monohydric phenols such as phenol, chroman-I [4-(2,4,4-trimethylchromanyl)phenol], p-t-butyl phenol, p-cumyl phenol, and the like. Preferably, phenol or p-tert-butyl phenol are employed as the molecular weight regulator. An effective amount of a molecular weight regulator that will give modified melt flow value (KI) of 1,000 to 50,000 centiseconds, preferably from 5,000 to 30,000 centiseconds may be used. Generally, it is preferred to use from 2-5 mol%, and more preferably from 2.5-4.5 mol% of phenol as the molecular weight regulator.

It is sometimes desirable to introduce reducing agents, such as sodium dithionite into the aqueous system in order to supress the formation of colored contaminants.

The aqueous interfacial polymerization method may be carried out at temperatures from ambient to about 50° C. However, higher temperatures are within the scope of this invention since the instant method is not temperature dependent.

The diphenol-tetraphenol mixture can be converted into branched polycarbonates also by esterification with dialkyl, alkylaryl or diaryl carbonates at elevated temperatures from about 50° C. to about 325° C., at atmospheric or at reduced pressure, in neat form, or in the presence of neutral diluents or in the presence of transesterification catalysts, such as metal oxides, hydroxides, carbonates and the like, as known in the art. When using aryl carbonates, phenols are generated in the transesterification process, so that no molecular weight regulators need be added to the reaction mixture. In fact the degree of polymerization is controlled by the extent of removal of the monohydroxylic coproducts, such as alcohols or phenols.

The branched polycarbonates, when produced according to the instant invention by the interfacial polymerization technique, was recovered from the washed, neutral methylene chloride phase by steam precipitation and drying and were fed into an extruder operating at 265° C. and the extrudates were comminuted into pellets. When prepared by the transesterification method, the polycarbonate melt was directly converted into extrudate and pellets.

While some of the physical-mechanical measurements can be carried out directly with the polycarbonate powder or pellets, some tests require molded specimens. To provide these, the pellets are injection molded at about 315° C., into test bars according to the dimensions required by the test method, such as the notched Izod impact test carried out according to ASTM D-256.

The following test procedures were utilized:

Intrinsic viscosity (I.V.) was determined in methylene chloride solution at 25° C. and is given as deciliters per gram (dl/g).

Molecular weight determinations (number average, $M_n$; weight average, $M_w$ and Z-average, $M_z$), were carried out on Waters Associates GPC Model 200, in methylene chloride solution.

Modified melt flow (K.I.) values, expressed in centiseconds, were obtained by an automated ASTM D-1238 procedure at 300° C. on a Tinius Olsen Melt Indexer, Model T-3, Condition 0.

Melt index ratio (M.I.R.), which is the ratio of melt flow rates at two different shear levels, and is a measure of the non-Newtonian property of the polymer, was obtained on the Tinius Olsen Melt Indexer described above. The M.I.R. values of linear Newtonian polycarbonates are typically less than 1.4, while those of the branched polycarbonates are typically higher than 1.5.

The branched polycarbonates produced according to the instant invention are soluble in selected organic solvents and can be worked into shaped articles from solutions, such as into films. Being thermoplastic, these branched polycarbonates, can be easily fabricated by conventional shaping methods from melt, such as by extrusion, molding, blow-molding, lamination and the like.

The branched polycarbonates of the invention may be combined with other polycarbonates or with thermoplastic polyesters such as polyethylene terephthalate or poly (1,4-butylene terephthalate). In addition, these branched polycarbonates may be combined with reinforcing fillers such as filamentous glass or with non-reinforcing fillers, mold release agents, flame retardants, impact modifiers, extrusion aids, light stabilizers, flame retardants, foaming agents, such as those disclosed in U.S. Pat. No. 4,263,409 and Ger. Offen. No. 2,400,086 which are incorporated by reference and the like if desired.

DESCRIPTION OF THE PREFERRED EMBODIMENTS

The following examples are set forth to illustrate the invention and are not to be construed to limit the scope of the invention.

EXAMPLE 1

Into a molten mixture of 564.0 g. (6 moles) of phenol was introduced 9.28 g. of mercaptoacetic acid and hydrogen chloride gas until saturation was obtained. Thereafter, 67.1 g. (0.5 mole) of 2,5-hexanedione was slowly added while the temperature was maintained at about 40° C. After two hours the HCl gas stream was removed and two hours later the heat was removed. Subsequently, the reaction mixture was heated on a steam bath and the undissolved solid material was filtered, washed with methylene chloride and air dried to yield 199.5 g. (87.7%) of orange solid. This material was heated with methanol to reflux and the undissolved white solid was recovered from the methanol by filtration; m.p. 317°-320° C.

A portion (0.56 g.) of the recovered solid material, 2,2,5,5-tetrakis(4-hydroxyphenyl)hexane, was dissolved in aqueous sodium hydroxide and added to 114.0 g. of bisphenol-A in a four necked, two liter flask that was equipped with a stirrer, thermometer, phosgene inlet tube and a reflux condenser that was connected to a caustic scrubber. In addition, 1.4 ml of triethylamine; 1.5 g. of phenol; 400 ml of methylene chloride and 300 ml of water was present in the flask. Phosgene was sparged into the flask at a rate of 1.0 g./minutes for 62 minutes while pH was automatically maintained at 11.4.

The reaction mixture was diluted with 300 ml of methylene chloride, washed sequentially with 0.01 N HCl and water and then the polymer was precipitated with methanol. The KI of the branched polymer (Run A) was 7560; IV 0.629 dl/g in methylene chloride at 25° C.; number average molecular weight 11,600; weight average molecular weight 44,900; Z verage 98,600 (gel permeation chromatography).

A second scaled up polymerization was carried out with 9.1 g (0.2 mol%) of 2,2,5,5-tetrakis(4-hydroxyphenyl)hexane as the branching agent in a reaction mixture that contained 2,280.0 g of bisphenol-A; 31.0 g (3.3 mol%) of phenol; 28 ml of triethylamine; in 7.0 liters of methylene chloride and 5.5 liters of water. All of the components were charged to a 30 l glass reactor (Corning QVF No VZ30/12) equipped with an agitator, a phosgene inlet and a pH controller. Phosgene was sparged in at a rate of 30 grams/minute for 47 minutes while the pH ranged from 11.3–11.8. The branched polymer (Run B) was washed and recovered. Table I reports the physical properties of the branched polymer Run B.

The test data obtained from the scaled up Run B was better than laboratory Run A because of improved reaction conditions due to the reactor design, size and controls as well as the use of larger quantities of reactants.

EXAMPLE 2

Following the procedure of the scaled up polymerization of Example 1 a similar branched polycarbonate (Run C) was made which was different in that 0.27 mol% of the same branching agent was used and 3.2 mol% of phenol was used. The physical properties of this polymer are reported in Table I.

EXAMPLE 3

Following the procedure of the scaled up polymerization of Example 1, a similar branched polycarbonate (Run D) was made which was different in that 0.21 mol% of the same branching agent was used. The physical properties of this polymer are reported in Table I.

EXAMPLE 4

Using the same general procedure of Example 1, the branching agent 1,2-tetrakis(4-hydroxyphenyl)ethane m.p. 307°–308° C. was made from glyoxal and phenol. A branched copolymer (Run E) was made using 0.20 mol% of 1.2-tetra4-hydroxyphenyl ethane according to the procedure of Example 1, Run B. The branched polymer had the physical properties set forth in Table I:

TABLE 1

| | I.V. (CH$_2$Cl$_2$ at 25° C. | KI | MIR | NOTCHED ft lb | IZOD duct. % | HDUL (°F.) 264 psi |
|---|---|---|---|---|---|---|
| Control* | 0.835 | 18,400 | 1.34 | 16.7 | 100 | 276.8 |
| Run B | 0.617 | 18,760 | 2.80 | 14.8 | 100 | 270.5 |
| Run C | 0.705 | 52,470 | — | 15.2 | 100 | — |
| Run D | 0.662 | 22,985 | 2.36 | 16.0 | 100 | 274.1 |
| Run E | 0.612 | 14,265 | 2.28 | 16.8 | 100 | 266.9 |

*Unbranched, bisphenol-A polycarbonate, made with 2.1 mol % phenol

EXAMPLE 5

The tetraphenol 2,2,5,5-tetrakis(3,5-dimethyl-4-hydroxyphenol)hexane m.p. 271°–273° C. was made from 2,5-hexanedione and 2,6-xylenol. This tetraphenol is useful as a branching agent for polycarbonates.

Other variations are possible in light of the above teachings. It is, therefore, to be understood that changes may be made in the particular embodiment of the invention described which are within the full intended scope of the invention as defined by the appended claims.

We claim:

1. A high molecular weight, thermoplastic, randomly branched polycarbonate of: an aromatic dihydric phenol; a branching component in an amount sufficient to produce a thermoplastic randomly branched polycarbonate which is substantially free of crosslinking; and a carbonate precursor selected from the group consisting of a carbonyl halide, a haloformate and a diaryl carbonate, said randomly branched polycarbonate having an intrinsic viscosity of about 0.30 to 1.0 dl/g in methylene chloride at 25° C., wherein the branching component comprises one or more tetraphenolic compounds of the formula:

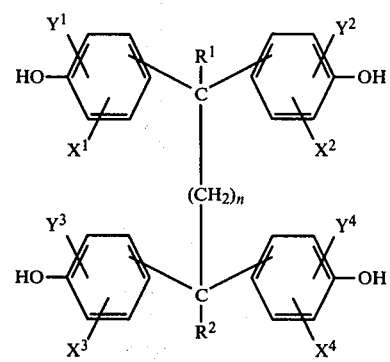

wherein $X^1$, $X^2$, $X^3$, $X^4$, $Y^1$, $Y^2$, $Y^3$ and $Y^4$ are independently selected from hydrogen, chlorine, bromine, alkyl of from 1 to 6 carbon atoms or aryl; n is an integer of 0, 1, 2, 3, 4, 5 or 6; and $R^1$ and $R^2$ are independently selected from hydrogen or alkyl of from 1 to 6 carbon atoms.

2. A high molecular weight thermoplastic, randomly branched polycarbonate as defined in claim 1 wherein the compound is 2,2,5,5-tetrakis(4-hydroxyphenyl)hexane.

3. A high molecular weight thermoplastic, randomly branched polycarbonate as defined in claim 1 wherein the branching agent is 1,2-tetrakis(4-hydroxyphenyl)ethane.

4. A high molecular weight, thermoplastic, randomly branched polycarbonate as defined in claim 1 wherein the branching component is present in an amount of 0.01 to about 3.0 mole percent, based on the total moles of dihydric phenol.

* * * * *